United States Patent
Yamaguchi et al.

(10) Patent No.: US 8,810,997 B2
(45) Date of Patent: *Aug. 19, 2014

(54) SOLID ELECTROLYTIC CAPACITOR AND METHOD OF MANUFACTURING THEREOF

(75) Inventors: Nobuyuki Yamaguchi, Saga (JP); Koji Fukuchi, Saga (JP); Yasuhiro Tsunezumi, Saga (JP)

(73) Assignees: SANYO Electric Co., Ltd., Moriguchi-shi, Osaka (JP); SAGA SANYO Industries Co., Ltd., Saga (JP)

( * ) Notice: Subject to any disclaimer, the term of this patent is extended or adjusted under 35 U.S.C. 154(b) by 72 days.

This patent is subject to a terminal disclaimer.

(21) Appl. No.: 13/529,710

(22) Filed: Jun. 21, 2012

(65) Prior Publication Data

US 2012/0262846 A1    Oct. 18, 2012

Related U.S. Application Data

(63) Continuation of application No. 12/862,319, filed on Aug. 24, 2010, now Pat. No. 8,228,664.

(30) Foreign Application Priority Data

Aug. 28, 2009    (JP) ................................ 2009-198240

(51) Int. Cl.
*H01G 9/028* (2006.01)

(52) U.S. Cl.
USPC ........... 361/524; 361/523; 361/525; 361/528; 361/529; 361/530

(58) Field of Classification Search
USPC .......... 361/528, 523–525, 529, 509, 516–519
See application file for complete search history.

(56) References Cited

U.S. PATENT DOCUMENTS

| | | | |
|---|---|---|---|
| 5,729,428 A | 3/1998 | Sakata et al. |
| 6,191,013 B1 | 2/2001 | Hahn et al. |
| 6,671,167 B2 | 12/2003 | Araki et al. |
| 6,671,168 B2 | 12/2003 | Yoshida et al. |
| 6,775,126 B2 | 8/2004 | Fujii et al. |

(Continued)

FOREIGN PATENT DOCUMENTS

| | | |
|---|---|---|
| JP | 2-74021 A | 3/1990 |
| JP | 2002-526914 A | 8/2002 |

(Continued)

OTHER PUBLICATIONS

Japanese Office Action dated May 28, 2013, issued in correspomnding Japanese Patent Application 2009-198240, with English translation (5 pages).

(Continued)

*Primary Examiner* — Nguyen T Ha
(74) *Attorney, Agent, or Firm* — Westerman, Hattori, Daniels & Adrian, LLP

(57) ABSTRACT

A solid electrolytic capacitor with suppressed occurrence of short circuit is provided. The solid electrolytic capacitor includes an anode body having a surface on which a dielectric film is formed, and a conductive polymer layer formed on the dielectric film. The conductive polymer layer includes at least a first conductive polymer layer formed on the dielectric film and a second conductive polymer layer formed on the first conductive polymer layer. A silane compound in the first conductive polymer layer and the silane compound in the second conductive polymer layer have respective concentrations different from each other.

6 Claims, 2 Drawing Sheets

(56) References Cited

U.S. PATENT DOCUMENTS

| | | |
|---|---|---|
| 7,125,764 B2 | 10/2006 | Taketani et al. |
| 7,126,812 B2 | 10/2006 | Hirata et al. |
| 7,602,602 B2 | 10/2009 | Takahashi et al. |
| 8,000,085 B2 | 8/2011 | Kobayashi et al. |
| 8,228,664 B2 * | 7/2012 | Yamaguchi et al. .......... 361/523 |
| 2005/0162815 A1 | 7/2005 | Tseng et al. |
| 2006/0286760 A1 | 12/2006 | Kirschbaum |
| 2008/0316680 A1 | 12/2008 | Iida et al. |

FOREIGN PATENT DOCUMENTS

| | | | |
|---|---|---|---|
| JP | 2005-109252 A | 4/2005 | |
| JP | 2005-129622 A | 5/2005 | |
| JP | 2006-261439 A | 9/2006 | |
| JP | 2006-352055 A | 12/2006 | |
| WO | 00/19469 A1 | 4/2000 | |

OTHER PUBLICATIONS

European Search Report dated Jan. 21, 2011, issued in corresponding European Patent Application No. 10008965.5.

Japanese Notice of Allowance dated Dec. 17, 2013, issued in Japanese Patent Application No. 2009-198240, w/ English translation, (6 pages).

* cited by examiner

US 8,810,997 B2

SOLID ELECTROLYTIC CAPACITOR AND METHOD OF MANUFACTURING THEREOF

CROSS-REFERENCE TO RELATED APPLICATIONS

This application is a Continuation of application Ser. No. 12/862,319, filed Aug. 24, 2010, which is a nonprovisional application based on Japanese Patent Application No. 2009-198240, filed on Aug. 28, 2009 with the Japan Patent Office, the entire contents of which are hereby incorporated by reference.

BACKGROUND OF THE INVENTION

1. Field of the Invention

The present invention relates to a solid electrolytic capacitor and a method of manufacturing the solid electrolytic capacitor, and particularly to a solid electrolytic capacitor with suppressed occurrence of short circuit and a method of manufacturing the solid electrolytic capacitor.

2. Description of the Related Art

Recently, electronic devices have been downsized and increased in frequency, which also requires downsizing and increased frequency of a capacitor that is an electronic component of an electronic device. An example of capacitors suitable for being downsized is a solid electrolytic capacitor including an anode body of a valve metal, a dielectric film formed on the anode body, and a layer of manganese dioxide or a conductive polymer for example formed on the dielectric film.

In the solid electrolytic capacitor, the dielectric film is produced through a chemical conversion performed on the valve metal of which the anode body is formed. The dielectric film produced in the above-described manner is extremely dense, highly durable, and very thin. The solid electrolytic capacitor can therefore be downsized without being reduced in capacitance, as compared with other types of capacitors such as paper capacitor and film capacitor.

Although such a solid electrolytic capacitor can be downsized, the downsized capacitor tends to encounter increased occurrences of leakage current (LC) and short circuit in the manufacturing process. Even after the capacitor has been manufactured, a high-temperature reflow process tends to cause LC.

With the purpose of suppressing such occurrence of short circuit, Japanese Patent Laying-Open No. 2005-109252 for example discloses the following method. An anode body on which a dielectric film is formed is immersed in a polymerizable monomer solution and dried so that a conductive polymer layer is formed, and thereafter further immersed in a conductive polymer solution (or conductive polymer solution is applied) and dried. According to Japanese Patent Laying-Open No. 2005-109252, this method can uniformly form the conductive polymer layer and thereby suppress occurrence of short circuit.

Currently, however, the need to suppress occurrence of short circuit still remains. Further, in addition to and simultaneously with suppression of occurrence of short circuit, maintenance of capacitor's intrinsic characteristics such as maintenance of the capacitance and suppression of increase in ESR (Equivalent Series Resistance), for example, are required.

SUMMARY OF THE INVENTION

An object of the present invention is to provide a solid electrolytic capacitor having suppressed occurrence of short circuit while keeping capacitor's intrinsic characteristics, and a method of manufacturing the solid electrolytic capacitor.

The inventors of the present invention have focused on the concentration of a silane compound in the conductive polymer layer of the solid electrolytic capacitor and conducted serious studies, and finally found that the concentration of the silane compound can be varied along the thickness direction of the conductive polymer layer to suppress occurrence of short circuit while capacitor's intrinsic characteristics are maintained. The present invention is based on this finding.

Specifically, the present invention is a solid electrolytic capacitor including an anode body having a surface on which a dielectric film is formed, and a conductive polymer layer formed on the dielectric film. The conductive polymer layer includes at least a first conductive polymer layer formed on the dielectric film and a second conductive polymer layer formed on the first conductive polymer layer. The first conductive polymer layer and the second conductive polymer layer contain a silane compound. The silane compound in the first conductive polymer layer and the silane compound in the second conductive polymer layer have respective concentrations different from each other.

Regarding the above-described solid electrolytic capacitor, preferably the concentration of the silane compound in the first conductive polymer layer is higher than the concentration of the silane compound in the second conductive polymer layer.

Regarding the above-described solid electrolytic capacitor, preferably the anode body is formed of a sintered body.

The present invention is a method of manufacturing a solid electrolytic capacitor including an anode body having a surface on which a dielectric film is formed, and a conductive polymer layer formed on a surface of the dielectric film. The method includes the steps of forming the dielectric film on the anode body, and forming the conductive polymer layer on the dielectric film. The step of forming the conductive polymer layer includes at least the steps of forming a first conductive polymer layer on the dielectric film by using a first polymerization solution containing a silane compound, and forming a second conductive polymer layer on the first conductive polymer layer by using a second polymerization solution containing a silane compound. The silane compound in the first polymerization solution and the silane compound in the second polymerization solution have respective concentrations different from each other.

Regarding the above-described method of manufacturing a solid electrolytic capacitor, preferably the concentration of the silane compound in the first polymerization solution is higher than the concentration of the silane compound in the second polymerization solution.

Regarding the above-described method of manufacturing a solid electrolytic capacitor, preferably the concentration of the silane compound in the first polymerization solution and the second polymerization solution is not less than 5% and not more than 30%.

Regarding the above-described method of manufacturing a solid electrolytic capacitor, preferably the anode body is formed of a sintered body.

"Precursor monomer" herein may not necessarily be a monomer and may include, for example, low-molecular-weight oligomers, and "oxidizer" herein may function as a dopant. Further, "concentration of substance A" in a polymerization solution constituted of substances A to C herein refers to the ratio X to Y+Z where X to Z represents respective weights of substances A to C, respectively.

The present invention can provide a solid electrolytic capacitor having suppressed occurrence of short circuit while keeping capacitor's intrinsic characteristics as well as a method of manufacturing the solid electrolytic capacitor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
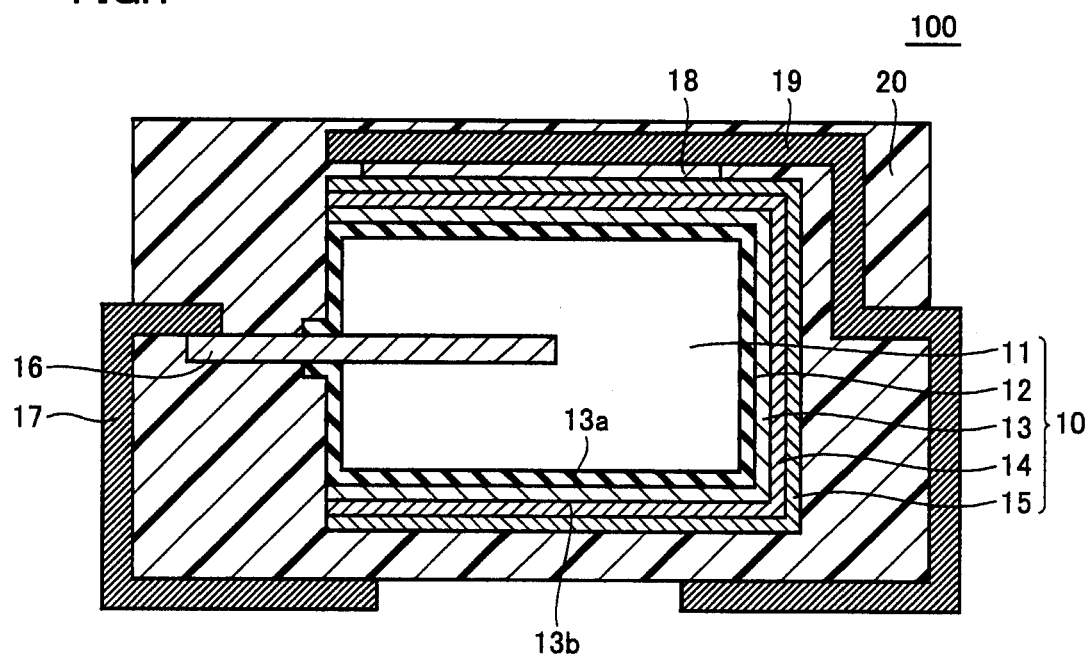
FIG. 1 is a cross section schematically showing a structure of a solid electrolytic capacitor according to an embodiment.

An embodiment of the present invention will hereinafter be described based on the drawings. In the drawings referenced below, the same or corresponding components are denoted by the same reference characters, and a description thereof will not be repeated. It should be noted that the relation between the components in terms of the dimension such as length, size, width or the like in the drawings has been changed as appropriate for the sake of clarification and simplification of the drawings, namely the dimension as shown does not represent the actual dimension.

Structure of Solid Electrolytic Capacitor

Referring to FIG. 1, a solid electrolytic capacitor 100 includes a capacitor element 10 that includes an anode body 11 having a surface on which a dielectric film 12 is formed, a conductive polymer layer 13 formed on dielectric film 12, and a carbon layer 14 and a silver paste layer 15 that are formed on conductive polymer layer 13 and serve as cathode lead layers.

Solid electrolytic capacitor 100 further includes an anode lead 16, an anode terminal 17, an adhesive layer 18, and a cathode terminal 19. Anode lead 16 is a rod-shaped body made of a metal such as tantalum for example, has one end embedded in anode body 11 and the other end placed to protrude on the outside of capacitor element 10. Anode terminal 17 has a part connected by welding to anode lead 16. Cathode terminal 19 is placed to connect to silver paste layer 15, which is the outermost layer of capacitor element 10, via adhesive layer 18 formed of an electrically conductive adhesive.

Solid electrolytic capacitor 100 further includes a coating resin 20. Coating resin 20 seals capacitor element 10 for which anode lead 16, anode terminal 17, adhesive layer 18, and cathode terminal 19 are arranged, in such a manner that exposes a part of anode terminal 17 and a part of cathode terminal 19 on coating resin 20.

In above-described solid electrolytic capacitor 100, anode body 11 is formed of a sintered body of a valve action metal (tantalum, niobium, titanium, aluminum, or the like), and dielectric film 12 is an oxide film formed through a chemical conversion performed on the valve action metal. For example, when tantalum (Ta) is used as the valve action metal, the composition of dielectric film 12 is $Ta_2O_5$ and, when aluminum (Al) is used as the valve action metal, the composition of dielectric film 12 is $Al_2O_3$. The sintered body here has a porous structure.

Conductive polymer layer 13 is constituted to include a conductive polymer and a silane compound. This conductive polymer layer 13 is formed on dielectric film 12 by, for example, immersing anode body 11 having its surface on which dielectric film 12 is formed, in a polymerization solution containing a precursor monomer of a conductive polymer, a silane compound, and an oxidizer. Alternatively, for example, anode body 11 on which dielectric film 12 is formed may be immersed in a polymerization solution containing a precursor monomer and a silane compound and thereafter immersed in a solution containing an oxidizer. Instead, for example, anode body 11 on which dielectric film 12 is formed may be immersed in a solution containing an oxidizer and thereafter immersed in a polymerization solution containing a precursor monomer and a silane compound. Instead, on anode body 11 on which dielectric film 12 is formed, a polymerization solution containing a precursor monomer, a silane compound, and an oxidizer may be applied.

As to the silane compound, the silane compound that is chemically bonded to an inorganic matter through hydrolysis and dehydration can protect a defect of the dielectric film. In view of such a function of the silane compound, it appears that the concentration of the silane compound in the conductive polymer layer can be increased to suppress occurrence of short circuit of the solid electrolytic capacitor. The inventors of the present invention, however, have found that the increased concentration of the silane compound, relative to the conventional concentration thereof, in conductive polymer layer 13 suppresses occurrence of short circuit of solid electrolytic capacitor 100 while it disadvantageously causes increase of ESR. A reason for this appears to be that the silane compound itself is an insulator.

In order to achieve both of suppression of occurrence of short circuit and suppression of increase of ESR, the inventors of the present invention have conducted serious studies to succeed in achieving both of suppression of occurrence of short circuit and suppression of increase of ESR, by varying the concentration of the silane compound along the thickness direction of conductive polymer layer 13.

More specifically, in solid electrolytic capacitor 100 of the present embodiment, the concentration of the silane compound in conductive polymer layer 13 is not uniform but varied in a stepwise manner along the thickness direction. A form of such a conductive polymer layer is shown in FIG. 1. Namely, conductive polymer layer 13 is constituted of a first conductive polymer layer (inner layer) having a surface 13a and a second conductive polymer layer (outer layer) having a surface 13b and formed on the first conductive polymer layer, and the concentration of the silane compound in the first conductive polymer layer and the concentration of the silane compound in the second conductive polymer layer are different from each other. In this way, occurrence of short circuit of the solid electrolytic capacitor can be suppressed effectively.

When conductive polymer layer 13 has a double layer structure as described above, preferably the concentration of the silane compound in the first conductive polymer layer is higher than the concentration of the silane compound in the second conductive polymer layer. In this case, occurrence of short circuit of solid electrolytic capacitor 100 can more effectively be suppressed.

Further, as will be understood, the structure of conductive polymer layer 13 is not limited to the double layer structure and may be constituted of any number of layers. In particular, it is preferable that a conductive polymer layer having surface 13a which is the innermost layer among the layers constituting conductive polymer layer 13, has the concentration of the silane compound higher than the concentration of the silane compound in another layer or other layers, particularly a conductive polymer layer having surface 13b which is the outermost layer. In this case, occurrence of short circuit of the solid electrolytic capacitor can more effectively be suppressed.

When conductive polymer layer 13 is constituted of a plurality of layers, the precursor monomer, the silane compound, the type of the oxidizer, and the type of a solvent containing them, which are used in forming each layer, may be different between the layers.

The conductive polymer which is a component of conductive polymer layer 13 is preferably a polymer having at least one of aliphatic-based compounds, aromatic-based compounds, heterocyclic-based compounds, and heteroatom-contained compounds. In particular, polythiophene, polypyrrole, polyaniline, polyfuran, TCNQ (7,7,8,8-tetracyanoquinodimethane) silver salt, or the like, is preferred.

Examples of the silane compound which is another component of conductive polymer layer 13 include, for example, vinyltrichlorosilane, vinyl(β-methoxysilane), vinyltriethoxysilane, γ-methacryloxysilane, β-(3,4-epoxycyclohexyl)ethyltrimethoxysilane, γ-glycidoxypropyltrimethoxysilane, N-β-(aminoethyl)-γ-aminopropylmethyldimethoxysilane, N-β-(aminoethyl)-γ-aminopropyltrimethoxysilane, γ-aminopropyltriethoxysilane, N-phenyl-γ-aminopropyltrimethoxysilane, γ-mercaptopropyltrimethoxysilane, γ-chloropropyltrimethoxysilane, and the like.

In particular, it is preferable to use, as the silane compound, γ-glycidoxypropyltrimethoxysilane or N-phenyl-γ-aminopropyltrimethoxysilane. They are excellent in terms of suppression of occurrence of short circuit and suppression of increase of ESR of solid electrolytic capacitor 100.

An example of the oxidizer is a sulfonic acid metal salt. The sulfonic acid metal salt serves as an oxidizer and as a dopant. The sulfonic acid may be alkyl sulfonic acid, aromatic sulfonic acid, polycyclic aromatic sulfonic acid, or the like, and the metal may be a metal selected as appropriate from iron (III), copper (II), chromium (IV), cerium (IV), ruthenium (III), zinc (II), and the like.

Carbon layer 14 serving as the cathode lead layer may at least have conductivity and, may be formed using graphite. Anode terminal 17 and cathode terminal 19 may be formed using a metal such as copper or copper alloy, for example. Epoxy resin for example may be used as a material for coating resin 20.

Method of Manufacturing Solid Electrolytic Capacitor

A description will now be given, using FIGS. 2A to 2E, of a method of manufacturing solid electrolytic capacitor 100. Here, by way of example, a method of manufacturing a solid electrolytic capacitor including conductive polymer layer 13 constituted of a first conductive polymer layer and a second conductive polymer layer will be described.

Figure 2A:
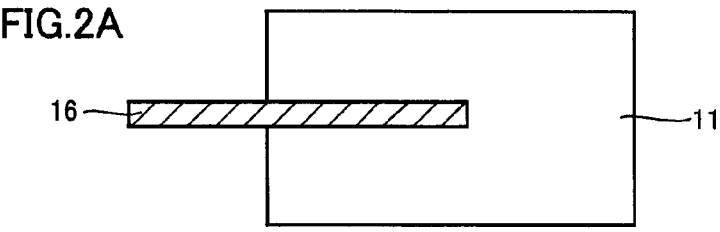
FIGS. 2A to 2E are process diagrams illustrating a method of manufacturing a solid electrolytic capacitor according to an embodiment.

Referring first to FIG. 2A, a valve action metal powder is prepared, and an end in the longitudinal direction of rod-shaped anode lead 16 is embedded in the metal powder. In this state, the powder is formed into a desired shape. This is sintered to form anode body 11 of a porous structure in which the end of anode lead 16 is embedded.

Figure 2B:
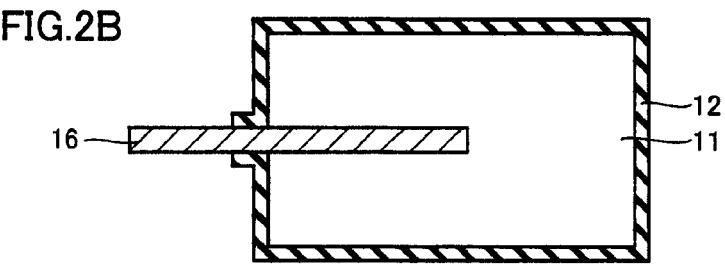

Next, as shown in FIG. 2B, anode body 11 undergoes a chemical conversion so that dielectric film 12 is formed on anode body 11. A method for the chemical conversion may be as follows. Anode body 11 is immersed in a forming solution such as an aqueous solution of phosphoric acid of 0.01 to 2% by mass or an aqueous solution of nitric acid, and a voltage is applied to anode body 11.

Next, anode body 11 on which dielectric film 12 is formed is immersed in a polymerization solution containing a precursor monomer, which is a precursor of a polymer forming conductive polymer layer 13, a silane compound, and an oxidizer, and conductive polymer layer 13 is formed on dielectric film 12. At this time, the concentration of the silane compound in the polymerization solution is adjusted such that the concentration of the silane compound in conductive polymer layer 13 varies in a stepwise manner along the thickness direction of conductive polymer layer 13, as described below.

Figure 2C:
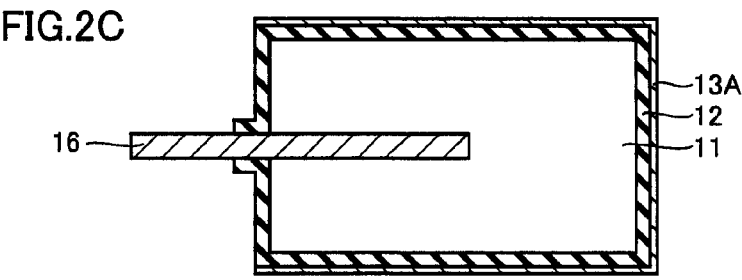

First, in a polymerization solution A that is a first polymerization solution containing a precursor monomer, a silane compound, and an oxidizer, anode body 11 on which dielectric film 12 is formed is immersed. Then, anode body 11 taken out of polymerization solution A is subjected to a dry process and the solvent is removed. Thus, as shown in FIG. 2C, an inner layer 13A that is a first conductive polymer layer is formed. For the dry process, heat treatment may be used.

Figure 2D:
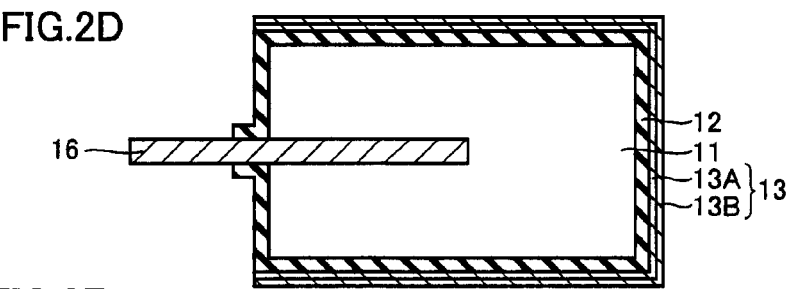

Next, in a polymerization solution B that is a second polymerization solution different from polymerization solution A in concentration of the silane compound, anode body 11 on which inner layer 13A is formed is immersed. Anode body 11 taken out of polymerization solution B is subjected to a dry process and the solvent is removed. Thus, as shown in FIG. 2D, an outer layer 13B that is a second conductive polymer layer is formed on inner layer 13A. For the dry process, heat treatment may be used.

As polymerization solution A and polymerization solution B, a solvent, for example, an organic solvent such as 1-butanol in which a precursor monomer, a silane compound, and an oxidizer are contained may be used. Polymerization reaction may be chemical oxidative polymerization, electrochemical polymerization, or the like. The chemical oxidative polymerization, with which the manufacturing process can be simplified and the concentration of the silane compound in conductive polymer layer 13 can be easily adjusted, is preferably used.

Figure 2E:
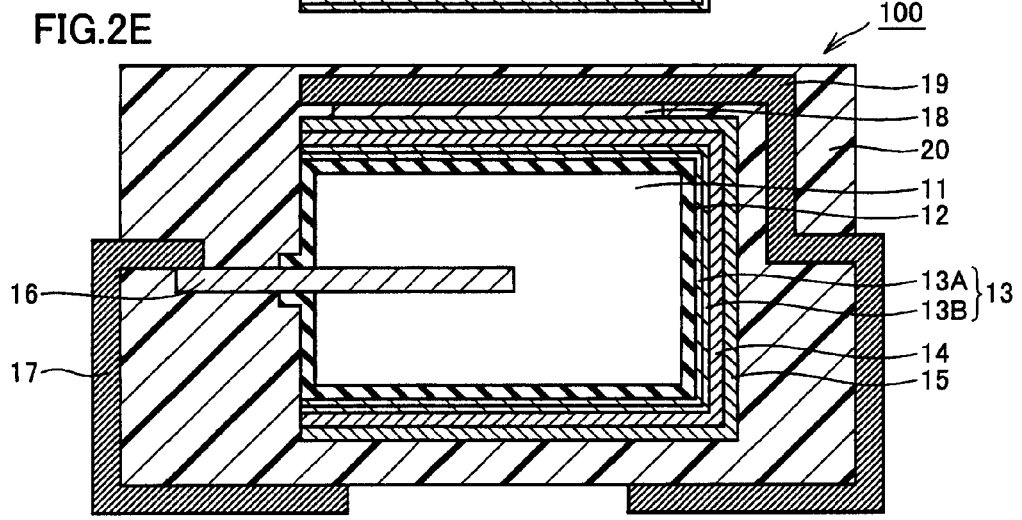

After this, on anode body 11 having been processed in the above-described manner, carbon layer 14, silver paste layer 15, anode terminal 17, adhesive layer 18, and cathode terminal 19 are arranged and sealed with coating resin 20, following a known technique. Accordingly, solid electrolytic capacitor 100 shown in FIG. 2E is produced.

According to the method of manufacturing a solid electrolytic capacitor in the present embodiment, conductive polymer layer 13 is formed through repeated immersion and drying processes and, among respective polymerization solutions used for the immersion processes, at least one polymerization solution has a concentration of a silane compound different from a concentration of the silane compound in another polymerization solution. Therefore, when conductive polymer layer 13 of a double layer structure for example is to be formed, conductive polymer layer 13 constituted of inner layer 13A and outer layer 13B that are different in concentration of the silane compound may be formed, as shown in FIG. 2E. In this way, increase of ESR due to an excessive increase of the amount of the silane compound in conductive polymer layer 13 can be suppressed and, at the same time, occurrence of short circuit can be suppressed.

Further, when conductive polymer layer 13 has a double layer structure as described above, preferably the concentration of the silane compound in inner layer 13A is higher than the concentration of the silane compound in outer layer 13B. In this case, occurrence of short circuit can more effectively be suppressed.

As to the concentration of the silane compound in polymerization solutions A and B, the ratio of the weight of the silane compound to the weight of substances other than the silane compound in polymerization solutions A and B is preferably not less than 5% and not more than 30%. In this case, effective suppression of increase of ESR due to the amount of the silane compound, as well as suppression of occurrence of short circuit can be achieved.

For conductive polymer layer 13 constituted of a plurality of layers, preferably the concentration of the silane compound in polymerization solution A, which is used for forming inner layer 13A having surface 13a abutting on dielectric film 12, is made higher than the concentration of the silane compound in polymerization solution B, which is used for forming an outer layer having surface 13b abutting on carbon layer 14. In this way, increase of ESR and occurrence of short circuit can more effectively be suppressed.

As seen from above, the present invention uses a plurality of polymerization solutions for forming a conductive polymer layer constituted of a plurality of layers, and at least one of the polymerization solutions has a concentration of the silane compound different from that of another or other polymerization solution(s). Accordingly, the solid electrolytic capacitor to be manufactured can keep capacitor's intrinsic characteristics, or can have improved capacitor's intrinsic characteristics, and occurrence of short circuit can be suppressed. Further, a plurality of polymerization solutions having respective concentrations of the silane compound that are varied in a stepwise manner can be used to form the conductive polymer layer in which the concentration of the silane compound varies in a stepwise manner.

The solid electrolytic capacitor of the present invention is not limited to the solid electrolytic capacitor in the embodiment as described above, but may be applied to known forms. Specific examples of the known forms may include a wound solid electrolytic capacitor, a stack-type solid electrolytic capacitor using plates of a valve metal, and the like.

It should be noted that, in a solid electrolytic capacitor having an anode body formed of a sintered body of a porous structure, a conductive polymer layer is formed on a dielectric film of the anode body generally by repeating multiple times the step of immersing the anode body in a polymerization solution and drying it. It is therefore easy in terms of the manufacturing process to form the conductive polymer layer of the solid electrolytic capacitor having the anode body of a sintered body, so that the conductive polymer layer has a double layer structure for example and an inner layer and an outer layer of the conductive polymer layer have different silane-compound concentrations from each other. Accordingly, it is preferable to apply the present invention to a solid electrolytic capacitor having an anode body formed of a sintered body.

EXAMPLES

In the following, the present invention will be described in more detail with reference to examples. The present invention, however, is not limited to them.

Example 1

For Example 1, a solid electrolytic capacitor having the structure shown in FIG. 2E was produced. First, a tantalum powder was prepared. An end, in the longitudinal direction, of rod-shaped anode lead 16 was embedded in the metal powder. In this state, the powder was shaped into a rectangular parallelepiped. The resultant powder was sintered to prepare anode body 11 in which the end of anode lead 16 was embedded. Then, anode body 11 was immersed in a phosphoric acid solution of 0.02% by mass, to which a voltage of 100 V was applied. Thus, dielectric film 12 of $Ta_2O_5$ was formed on a surface of anode body 11.

Subsequently, polymerization solution A was prepared by mixing, in 1-butanol, 3,4-ethylenedioxythiophene as a precursor monomer, γ-glycidoxypropyltrimethoxysilane as a silane compound, and iron (III) p-toluenesulfonate as an oxidizer having the function of dopants. Polymerization solution A was prepared so that the ratio by weight between the compounds, namely 3,4-ethylenedioxythiophene:γ-glycidoxypropyltrimethoxysilane:iron (III) p-toluenesulfonate:1-butanol, was 1:0.9:5:11.5. Then, anode body 11 on which dielectric film 12 was formed was immersed in this polymerization solution A for one minute. After this, anode body 11 was taken out of polymerization solution A and heat-treated, so that inner layer 13A of conductive polymer layer 13 was formed.

Subsequently, anode body 11 having inner layer 13A formed thereon was immersed in polymerization solution B prepared so that the ratio by weight between the compounds was 3,4-ethylenedioxythiophene:γ-glycidoxypropyltrimethoxysilane:iron (III) p-toluenesulfonate:1-butanol=1:1.5:5:8.5. After this, anode body 11 was taken out of polymerization solution B and heat-treated, so that outer layer 13B of conductive polymer layer 13 was formed.

On anode body 11 having been dried, a suspension of graphite particles was further applied, and the anode body was dried in the atmosphere so that carbon layer 14 was formed on outer layer 13B. Further, following a known technique, silver paste layer 15, anode terminal 17, adhesive layer 18, and cathode terminal 19 were arranged, and they were sealed with coating resin 20 as shown in FIG. 2E. In this way, the solid electrolytic capacitor was manufactured.

Example 2

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:1.8:5:11.5, and polymerization solution B was prepared so that the ratio was 3,4-ethylenedioxythiophene:γ-glycidoxypropyltrimethoxysilane:iron (III) p-toluenesulfonate:1-butanol=1:0.7:5:8.5.

Example 3

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:2.6:5:11.5, and polymerization solution B was prepared so that the ratio was 3,4-ethylenedioxythiophene:γ-glycidoxypropyltrimethoxysilane:iron (III) p-toluenesulfonate:1-butanol=1:0.7:5:8.5.

Example 4

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:3.5:5:11.5, and polymerization solution B was prepared so that the ratio was 3,4-ethylenedioxythiophene:γ-glycidoxypropyltrimethoxysilane:iron (III) p-toluenesulfonate:1-butanol=1:0.7:5:8.5.

Example 5

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:5.3:5:11.5, and polymerization solution B was prepared so that the ratio was 3,4-ethylenedioxythiophene:γ-glycidoxypropyltrimethoxysilane:iron (III) p-toluenesulfonate:1-butanol=1:0.7:5:8.5.

Comparative Example 1

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:0.04:5:11.5, and polymerization solution B was prepared so that the ratio was 3,4-ethylenedioxythiophene:γ-glycidoxypropyltrimethoxysilane:iron (III) p-toluenesulfonate:1-butanol=1:0.03:5:8.5.

Comparative Example 2

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:0.18:5:11.5, and polymerization solution B was prepared so that the ratio was 3,4-ethylenedioxythiophene:γ-glycidoxypropyltrimethoxysilane:iron (III) p-toluenesulfonate:1-butanol=1:0.15:5:8.5.

Comparative Example 3

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:0.7:5:11.5, and polymerization solution B was prepared so that the ratio was 3,4-ethylenedioxythiophene:γ-glycidoxypropyltrimethoxysilane:iron (III) p-toluenesulfonate:1-butanol=1:0.6:5:8.5.

Comparative Example 4

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:0.9:5:11.5, and polymerization solution B was prepared so that the ratio was 3,4-ethylenedioxythiophene:γ-glycidoxypropyltrimethoxysilane:iron (III) p-toluenesulfonate:1-butanol=1:0.7:5:8.5.

Comparative Example 5

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:1.8:5:11.5, and polymerization solution B was prepared so that the ratio was 3,4-ethylenedioxythiophene:γ-glycidoxypropyltrimethoxysilane:iron (III) p-toluenesulfonate:1-butanol=1:1.5:5:8.5.

Comparative Example 6

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:3.5:5:11.5, and polymerization solution B was prepared so that the ratio was 3,4-ethylenedioxythiophene:γ-glycidoxypropyltrimethoxysilane:iron (III) p-toluenesulfonate:1-butanol=1:2.9:5:8.5.

Comparative Example 7

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:5.3:5:11.5, and polymerization solution B was prepared so that the ratio was 3,4-ethylenedioxythiophene:γ-glycidoxypropyltrimethoxysilane:iron (III) p-toluenesulfonate:1-butanol=1:4.4:5:8.5.

Comparative Example 8

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:7:5:11.5, and polymerization solution B was prepared so that the ratio was 3,4-ethylenedioxythiophene:γ-glycidoxypropyltrimethoxysilane:iron (III) p-toluenesulfonate:1-butanol=1:5.8:5:8.5.

Comparative Example 9

A solid electrolytic capacitor was manufactured by a similar method to Example 1 except that polymerization solutions A and B prepared in the following manner were used. Specifically, polymerization solution A was prepared so that the ratio was 3,4-ethylenedioxythiophene:γ-glycidoxypropyltrimethoxysilane:iron (III) p-toluenesulfonate:1-butanol=1:8.8:5:11.5, and polymerization solution B was prepared so that the ratio was 3,4-ethylenedioxythiophene:γ-glycidoxypropyltrimethoxysilane:iron (III) p-toluenesulfonate:1-butanol=1:7.3:5:8.5.

Performance Evaluation

Relative Value of Capacitance

For the solid electrolytic capacitors of the Examples and Comparative Examples each, the capacitance (μF) as an initial characteristic was measured. Specifically, from solid electrolytic capacitors of the Examples and Comparative Examples, 120 solid electrolytic capacitors were selected at random for each Example and each Comparative Example. An LCR meter of four-terminal type was used to measure the initial capacitance (μF) at a frequency of 120 Hz of each solid electrolytic capacitor. The average capacitance of each Example and that of each Comparative Example were calculated. The average initial capacitance of the solid electrolytic capacitors of Comparative Example 1 was used as a reference value, and the relative value of the average initial capacitance of the solid electrolytic capacitors, with respect to the reference value, was calculated for each Example and each Comparative Example. The results are summarized in Table 1.

LC-Defect-Free Rate

For the solid electrolytic capacitors of the Examples and Comparative Examples each, the LC-defect-free rate (%) was measured. LC-defect-free rate is an index representing the degree of leakage current of a solid electrolytic capacitor. Specifically, from solid electrolytic capacitors of the Examples and Comparative Examples, 120 solid electrolytic capacitors were selected at random for each Example and each Comparative Example. To each solid electrolytic capacitor, a resistor of 1 kΩ was connected in series and, after a rated voltage of 25V of a DC power supply was applied for one minute, leakage current was measured. It was determined that a solid electrolytic capacitor with a leakage current amount of 37.5 μA or less was a non-defective product. The LC-defect-free rate of the Examples and Comparative Examples each was calculated. The results are summarized in Table 1.

ESR Value

For the solid electrolytic capacitors of the Examples and Comparative Examples each, the ESR value (mΩ) as an initial characteristic was measured. Specifically, from solid electrolytic capacitors of the Examples and Comparative Examples, 120 solid electrolytic capacitors were selected at random for each Example. An LCR meter of four-terminal type was used to measure the ESR value (mΩ) at a frequency of 100 Hz of each solid electrolytic capacitor. The average of each Example and that of each Comparative Example were calculated. The results are summarized in Table 1.

Rate of Occurrence of Short Circuit

For the solid electrolytic capacitors of the Examples and Comparative Examples each, the rate of occurrence of short circuit was measured. Specifically, a hot-air reflow test, which is a reliability test, was conducted as follows. In an environment of 121° C. or higher and 2 atmospheric pressure, solid electrolytic capacitors of the Examples and Comparative Examples each were left for 12 hours to cause forced moisture absorption, and thereafter the capacitors were kept at a highest temperature of 260° C. for ten seconds, which was repeated four times. To the solid electrolytic capacitors of the Examples and Comparative Examples each having undergone the reflow test, a rated voltage of 25 V was applied for one minute to make a test as to whether short circuit occurred or not. Then, the rate of occurrence of short circuit to solid electrolytic capacitors of the Examples and Comparative Examples each was calculated. It was determined that short circuit had occurred when a leakage current of 1 mA or higher was measured. The results are summarized in Table 1.

TABLE 1

| | concentration of silane compound in polymerization solution (%) | | relative value of capacitance (with | | | rate of |
| | polymerization solution A (inner layer) | polymerization solution B (outer layer) | respect to Comparative Example 1) (%) | LC-defect-free rate (%) | ESR value (mΩ) | occurrence of short circuit (%) |
| --- | --- | --- | --- | --- | --- | --- |
| Example 1 | 5 | 10 | −2 | 98 | 75 | 12 |
| Example 2 | 10 | 5 | −2 | 98 | 78 | 2.4 |
| Example 3 | 15 | 5 | −2 | 98 | 86 | 2.3 |
| Example 4 | 20 | 5 | −2 | 98 | 98 | 2.3 |
| Example 5 | 30 | 5 | −3 | 98 | 110 | 2.3 |
| Comparative Example 1 | 0.2 | 0.2 | 0 (reference) | 0 | — | — |
| Comparative Example 2 | 1 | 1 | −1 | 80 | 62 | 50 |
| Comparative Example 3 | 4 | 4 | −2 | 95 | 67 | 25 |
| Comparative Example 4 | 5 | 5 | −2 | 98 | 70 | 17 |
| Comparative Example 5 | 10 | 10 | −2 | 98 | 90 | 2.4 |
| Comparative Example 6 | 20 | 20 | −2 | 98 | 120 | 2.3 |
| Comparative Example 7 | 30 | 30 | −3 | 98 | 150 | 2.3 |
| Comparative Example 8 | 40 | 40 | −10 | — | — | — |
| Comparative Example 9 | 50 | 50 | −15 | — | — | — |

It has been confirmed from the results shown in Table 1 that, when the concentration of the silane compound in the conductive polymer layer is substantially equal to the conventional one (Comparative Examples 1 to 3), the short circuit occurrence rate is higher and the LC-defect-free rate is lower, while Examples 1 to 5 and Comparative Examples 4 to 7 have a lower short circuit occurrence rate and a higher LC-defect-free rate. It has also been confirmed that Comparative Examples 8 and 9 have a considerably decreased capacitance.

From a comparison of Example 1 with Comparative Examples 4 and 5 as to the ESR value and the rate of occurrence of short circuit, it has been found that Example 1 is superior in terms of the characteristics of the capacitor as a whole. It has accordingly been found that a solid electrolytic capacitor having superior capacitor's intrinsic characteristics can be obtained by preparing respective polymerization solutions used for respective immersion processes so that the concentration of the silane compound is different, namely the concentration of the silane compound is varied stepwise along the thickness direction of conductive polymer layer 13.

For Example 2, conductive polymer layer 13 was formed using polymerization solution A having a higher concentration of the silane compound than that of polymerization solution B, so that the concentration of the silane compound of inner layer 13A was higher than that of outer layer 13B. It has been found that, in this case, the capacitor's characteristics are superior as a whole in terms of capacitance, LC-defect-free rate, ESR value, and short circuit occurrence rate. It has therefore been found that conductive polymer layer 13 is preferably formed using a polymerization solution for a first immersion process that is higher in concentration of the silane compound than a polymerization solution for a second immersion process.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A solid electrolytic capacitor comprising:
    an anode body having a surface on which a dielectric film is formed; and
    a cathode layer formed on said dielectric film,
    said cathode layer including at least a first conductive polymer layer and a second conductive polymer layer,
    said first conductive polymer layer and said second conductive polymer layer containing a silane compound, and
    the silane compound in said first conductive polymer layer and the silane compound in said second conductive polymer layer having respective concentrations different from each other.

2. The solid electrolytic capacitor according to claim 1, wherein
    said first conductive polymer layer is located closer to said dielectric film than said second conductive polymer layer, and
    the concentration of the silane compound in said first conductive polymer layer is higher than the concentration of the silane compound in said second conductive polymer layer.

3. A method of manufacturing a solid electrolytic capacitor comprising the steps of:
    forming a dielectric film on a surface of an anode body; and
    forming a cathode layer on a surface of the dielectric film,
    said step of forming a cathode layer including at least the steps of:
        forming a first conductive polymer layer by using a first treatment solution containing a silane compound; and
        forming a second conductive polymer layer by using a second treatment solution containing a silane compound, and
    the silane compound in said first treatment solution and the silane compound in said second treatment solution having respective concentrations different from each other.

4. The method of manufacturing a solid electrolytic capacitor according to claim 3, wherein
    said step of forming a first conductive polymer layer is performed prior to said step of forming a second conductive polymer layer, and
    the concentration of the silane compound in said first treatment solution is higher than the concentration of the silane compound in said second treatment solution.

5. The method of manufacturing a solid electrolytic capacitor according to claim 3, wherein
    the concentration of the silane compound in said first treatment solution and the concentration of the silane compound in said second treatment solution are not less than 5% and not more than 30%.

6. The method of manufacturing a solid electrolytic capacitor according to claim 4, wherein
    the concentration of the silane compound in said first treatment solution and the concentration of the silane compound in said second treatment solution are not less than 5% and not worse than 30%.

* * * * *